(12) United States Patent
Schmitt (10) Patent No.: US 10,145,364 B2
(45) Date of Patent: Dec. 4, 2018

(54) DEVICE FOR FASTENING AND/OR GUIDING STRAND-SHAPED ELEMENTS

(71) Applicant: HYDAC ACCESSORIES GMBH, Sulzbach/Saar (DE)

(72) Inventor: Martin Schmitt, Knopp-Labach (DE)

(73) Assignee: HYDAC ACESSORIES GMBH, Sulzbach/Saar (DE)

( * ) Notice: Subject to any disclaimer, the term of this patent is extended or adjusted under 35 U.S.C. 154(b) by 0 days.

(21) Appl. No.: 15/525,624

(22) PCT Filed: Oct. 1, 2015

(86) PCT No.: PCT/EP2015/001935
§ 371 (c)(1),
(2) Date: May 10, 2017

(87) PCT Pub. No.: WO2016/074753
PCT Pub. Date: May 19, 2016

(65) Prior Publication Data
US 2017/0321663 A1 Nov. 9, 2017

(30) Foreign Application Priority Data
Nov. 14, 2014 (DE) .......................... 10 2014 016 869

(51) Int. Cl.
*F03D 80/80* (2016.01)
*H02G 3/32* (2006.01)
*F16L 3/22* (2006.01)

(52) U.S. Cl.
CPC .............. *F03D 80/85* (2016.05); *F16L 3/222* (2013.01); *H02G 3/32* (2013.01); *F05B 2260/30* (2013.01); *Y02E 10/72* (2013.01)

(58) Field of Classification Search
CPC .......... F03D 80/85; F03D 80/80; F03D 80/82; H02G 3/32; H02G 3/26; H02G 3/28;
(Continued)

(56) References Cited

U.S. PATENT DOCUMENTS 4,194,712 A * 3/1980 Elvegaard ............. F16L 3/1091
24/278
7,288,730 B2 * 10/2007 Habel ...................... H02G 3/22
16/2.1
(Continued)

FOREIGN PATENT DOCUMENTS

DE   10 2010 032 687     2/2012
DE   10 2011 012 391     8/2012
(Continued)

OTHER PUBLICATIONS

International Search Report (ISR) dated Dec. 11, 2015 in International (PCT) Application No. PCT/EP2015/001935.

*Primary Examiner* — Christopher Garft
(74) *Attorney, Agent, or Firm* — Wenderoth, Lind & Ponack, L.L.P.

(57) ABSTRACT

A device for fastening and/or guiding strand-shaped elements, in particular cables or cable bundles wind turbines includes retaining bodies (5) combinable with a supporting structure (3) in the form of a star body to form a modular fastening system, having a strand passage (31) for a strand element. Each retaining body has two partial bodies (25 and 27), each of which has a part (29) of the strand feedthrough (31). Between surfaces (13) of consecutive spokes (9) of the star body of the supporting structure (3) extending parallel to each other, installation spaces (21) for retaining bodies (5) are formed. The installation spaces are open towards the outside of said star body and have sides that are parallel to each other, A retaining device (59, 61, 63) is provided between each partial body (25, 27) and the spoke (9) adjacent to it. The partial bodies (25, 27) can be detachably fastened in the installation position on the supporting structure (3) and in contact with each other such that the retaining body (5) is completed.

12 Claims, 7 Drawing Sheets

(58) Field of Classification Search
CPC .......... H02G 3/30; F05B 2260/30; F16L 3/10; F16L 3/1091; F16L 3/222; F16L 3/08; F16L 3/22; F16L 3/221; F16L 3/223; F16L 5/02; Y02E 10/72
See application file for complete search history.

(56) References Cited

U.S. PATENT DOCUMENTS

| | | | | |
|---|---|---|---|---|
| 7,938,371 | B2 * | 5/2011 | Oga | F16L 3/1025 248/55 |
| 8,366,396 | B2 * | 2/2013 | Barton | H02G 3/32 416/146 R |
| 8,664,544 | B2 * | 3/2014 | Even | F03D 80/85 174/144 |
| 2002/0012582 | A1 | 1/2002 | Kirkegaard et al. | |
| 2004/0094965 | A1 | 5/2004 | Kirkegaard et al. | |
| 2010/0308183 | A1 * | 12/2010 | Hennon | F16L 3/1091 248/67.5 |
| 2011/0303456 | A1 * | 12/2011 | Blanchard | F16L 3/1091 174/480 |
| 2014/0034789 | A1 | 2/2014 | Caspari et al. | |
| 2015/0211659 | A1 | 7/2015 | Even | |

FOREIGN PATENT DOCUMENTS

| | | |
|---|---|---|
| DE | 10 2012 007 416 | 10/2013 |
| DE | 10 2012 019 490 | 4/2014 |
| DE | 10 2012 019 493 | 4/2014 |
| WO | 00/36724 | 6/2000 |

* cited by examiner

DEVICE FOR FASTENING AND/OR GUIDING STRAND-SHAPED ELEMENTS

FIELD OF THE INVENTION

The invention relates to a device for fastening and/or guiding strand-shaped elements, in particular cables or cable bundles in the case of wind turbines. The device comprises retaining bodies, which can be combined with a supporting structure in the form of a star body to form a modular fastening system. This system has a strand passage for at least one strand element. The retaining bodies are formed from two partial bodies, each of which comprises a part of the strand feedthrough.

BACKGROUND OF THE INVENTION

To discharge the energy generated in wind turbines, as well as for other operational purposes, such as control, monitoring, and the like, cables and lines, which run through the tower into the power house, must be reliably fastened by supporting structures in the tower, in particular on the tower segments. As related prior art, document DE 10 2012 019 493 A1 discloses a device of this type. In this known device, the supporting structure has the form of a circular disk, in which round receiving spaces for round retaining bodies are provided along the circumference. For the purpose of formation of a kind of star shape, slit openings extending outwards from the installation spaces are provided. The width of these slit openings is less than the width of the installation spaces. To facilitate installation of the retaining bodies in this type of design, the disk is made up of two identical plates that can be screwed together.

SUMMARY OF THE INVENTION

On the basis of this prior art, the invention addresses the problem of providing a device of this type, which device is distinguished by particularly easy installation with respect to both the construction of the modular fastening system and the insertion of the strand elements concerned into the strand feedthroughs.

According to the invention this problem is basically solved by a device having, as a distinctive feature of the invention, between parallel surfaces of consecutive spokes of the star body, installation spaces for retaining bodies. The installation spaces are open towards the outside of the star body and have sides that are parallel to one another. A retaining device is provided between each partial body and the spoke adjacent thereto. By the retaining devices, the partial bodies can be detachably fastened in the installation position on the supporting structure and in contact with each other in such a way that the retaining body is completed. This arrangement allows any fastening system to be easily constructed by insertion of a desired number of retaining bodies in any reciprocal arrangement, without plates of the supporting structure needing to be separated and reattached to one another for installation operations. Because, according to the invention, the partial bodies of the retaining bodies can furthermore each individually be secured in the installation space by the retaining device, the assembly operation of insertion of the strand elements becomes particularly simple because the insertion operation can take place in a simple manner from the open end of the installation space after insertion and fastening of the inner partial body. After that insertion operation, the outer partial body is also introduced into the installation space and secured by the retaining device.

In a particularly advantageous manner, no threading of strand elements through closed strand feedthroughs is required.

The device according to the invention can be produced in an economical manner with partial bodies formed from two identical parts, which are preferably injection molded in one piece from a plastic material.

Regarding the formation of the retaining device, the arrangement can advantageously be such that the retaining device has catches on the sides of the spokes facing the installation spaces and on the sides of the partial bodies associated with those spokes for the purpose of detachable locking. The assembly operation is particularly simple and practical when the catches are formed such that the locking occurs automatically when the partial bodies are introduced into the installation space.

In particularly advantageous exemplary embodiments, the partial bodies have a recess on both of the sides facing the spokes. The recesses form a channel, which receives at least a portion of the associated spoke when the partial bodies are introduced into the installation space. Once the partial bodies have been introduced, the retaining bodies are then secured against axial forces acting via the strand elements by a form fit formed between the channel walls and the spokes of the supporting structure.

Regarding the formation of the retaining device, the arrangement can advantageously be such that, on the spokes for each adjacent partial body, the catches have sunk catch notches and, for cooperation therewith, a respective detent on the partial bodies. The detents are arranged in the channel-shaped recess on a flexible tongue in each case.

For a particularly secure fastening of the retaining bodies against being pushed out of the installation space by the retaining device, the retaining device can advantageously be formed such that the catch notches of the spokes associated with the partial body of the respective retaining body lying on the outside on the supporting structure form a hook-shaped projecting locking surface. With the associated detent of the partial body concerned, the locking surface prevents the partial body from being pushed out by a form fit. However, in order to permit a desired disassembly of retaining bodies without requiring the use of tools, the arrangement can be such that the flexible tongues of the detents of the partial body lying on the outside are accessible for release of the catch engagement.

In particularly advantageous exemplary embodiments, the star-shaped supporting structure has, as an inner boundary of the installation spaces, a noncircular inner ring in the form of an octahedron. The partial bodies of the retaining bodies have, on their straight end side extending between the sides having the detents, a channel-shaped recess in which the inner ring of the star-shaped supporting structure engages in the case of the partial body lying on the inside. The retaining bodies are then secured not only against shifting inwards in the radial direction, but also against axial forces due to the engagement of the inner ring.

In advantageous exemplary embodiments, on the partial bodies next to a depression forming half of the strand passage, in each case a flat contact surface is formed perpendicular to the sides associated with the spokes for contacting of the partial bodies. A projecting positioning pin and a bore, provided for the engagement of the pin of the contacting partial body, are formed on each of the contact surfaces.

For structurally-strong cohesion of the formed fastening system, the device according to the invention preferably provides for a tensioning strap guided over the outside of the retaining bodies located in the installation space. This tensioning strap can be tensioned with a manually-actuatable quick-tensioning closure.

Because, in standard wind turbines, the power house with the generator unit, from which the cable bundle hangs down into the tower, can realize up to three rotations during operation before the power house is steered back, the twisting produced results in cable bundle length changes. Allowance for vertical mobility for a supporting structure non-rotatably mounted in the tower is necessary. In advantageous exemplary embodiments of the invention, the arrangement is therefore such that, on diametrically opposite sides of the tensioning strap, guide rollers are mounted on the tensioning strap for the guide engagement with slide rails vertically arranged in the tower of a wind turbine.

To prevent the direction changes of the cables, produced when the bundle is twisted, from resulting in localized overloading of the cables and their insulation in the region of the retaining bodies, the strand feedthrough of the respective retaining bodies preferably has a geometry that is wear-favorable for fed-through strand elements. In particular, the retaining bodies have rounded end edges of the passage.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
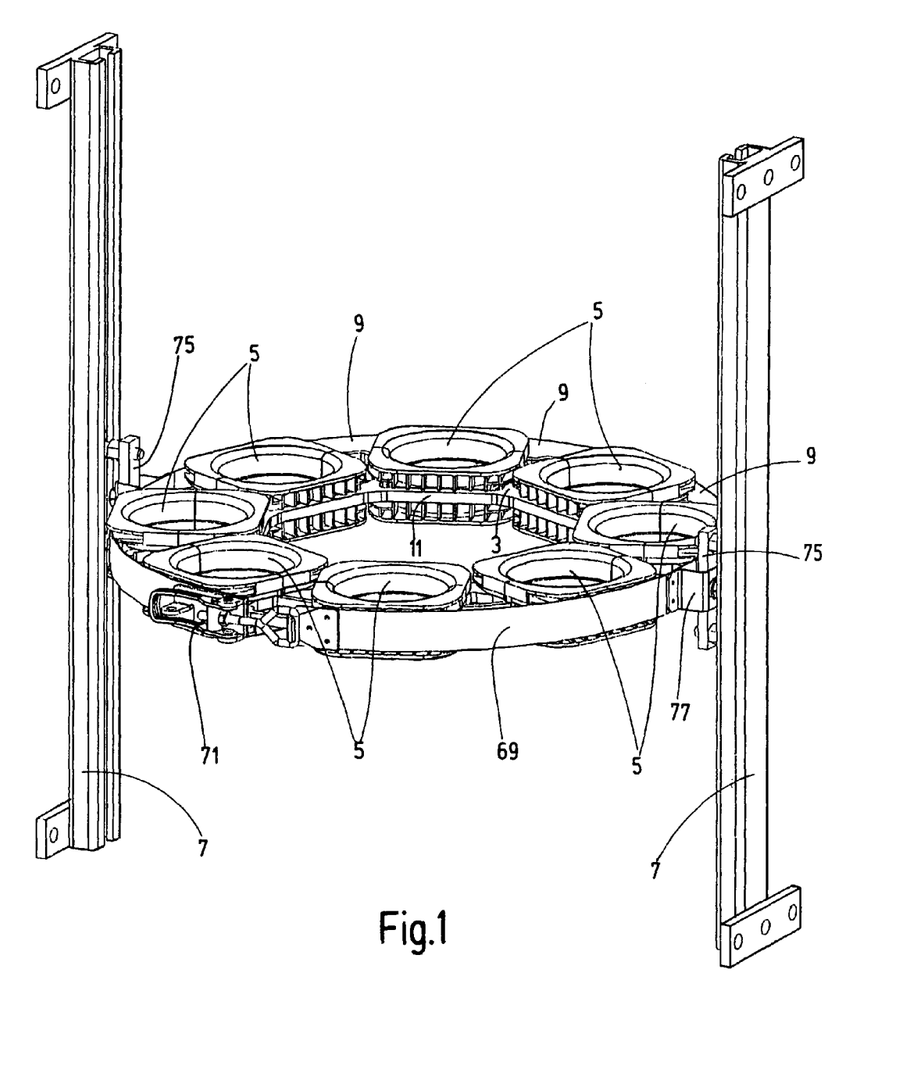
FIG. 1 is a perspective view of a device according to an exemplary embodiment of the invention, which device is guided in a vertically mobile manner on slide rails in the tower of a wind turbine.
Figure 2:
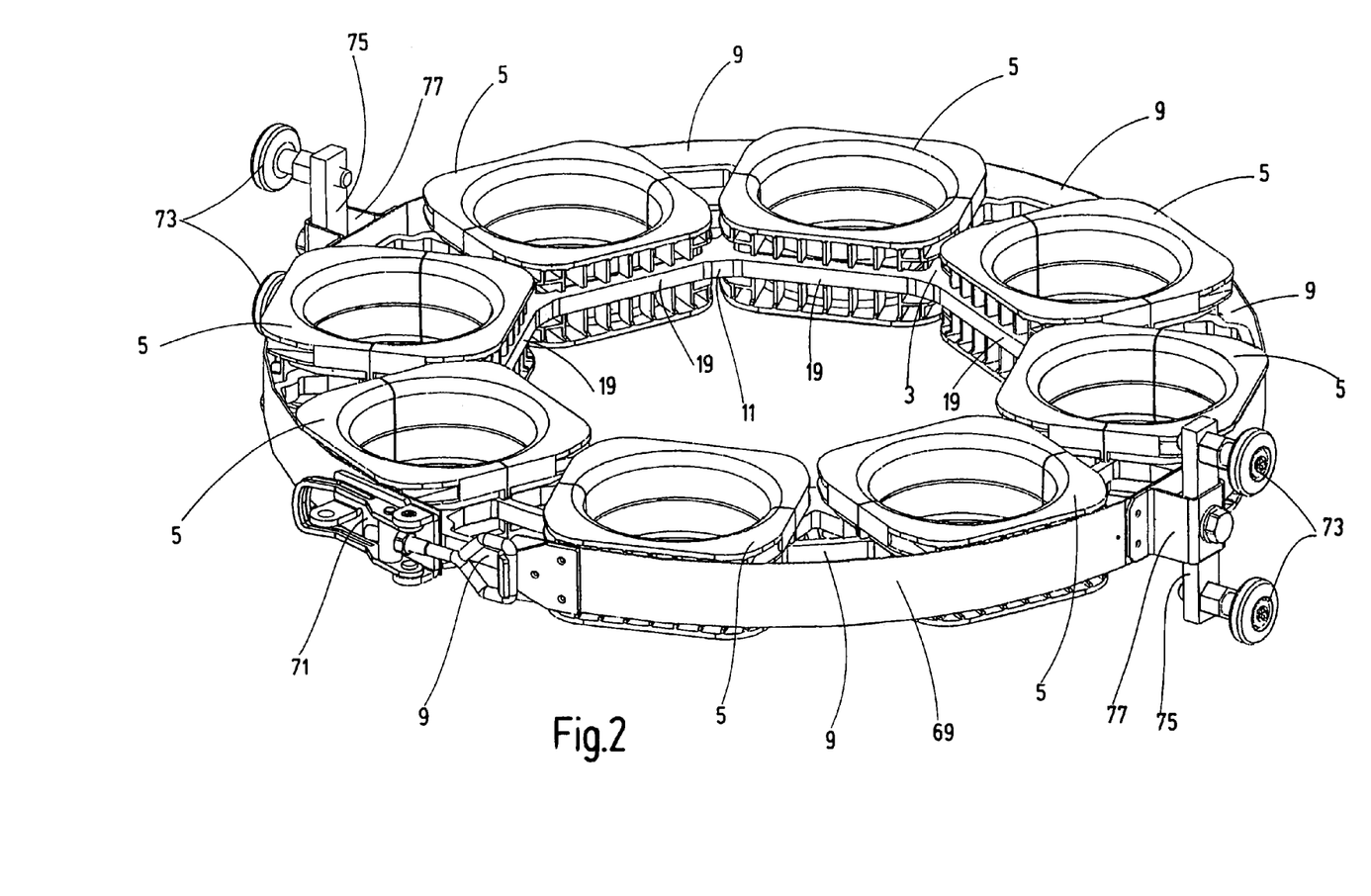
FIG. 2 is a perspective view of the device of FIG. 1 depicted on a larger scale, without slide rails.
Figure 3:
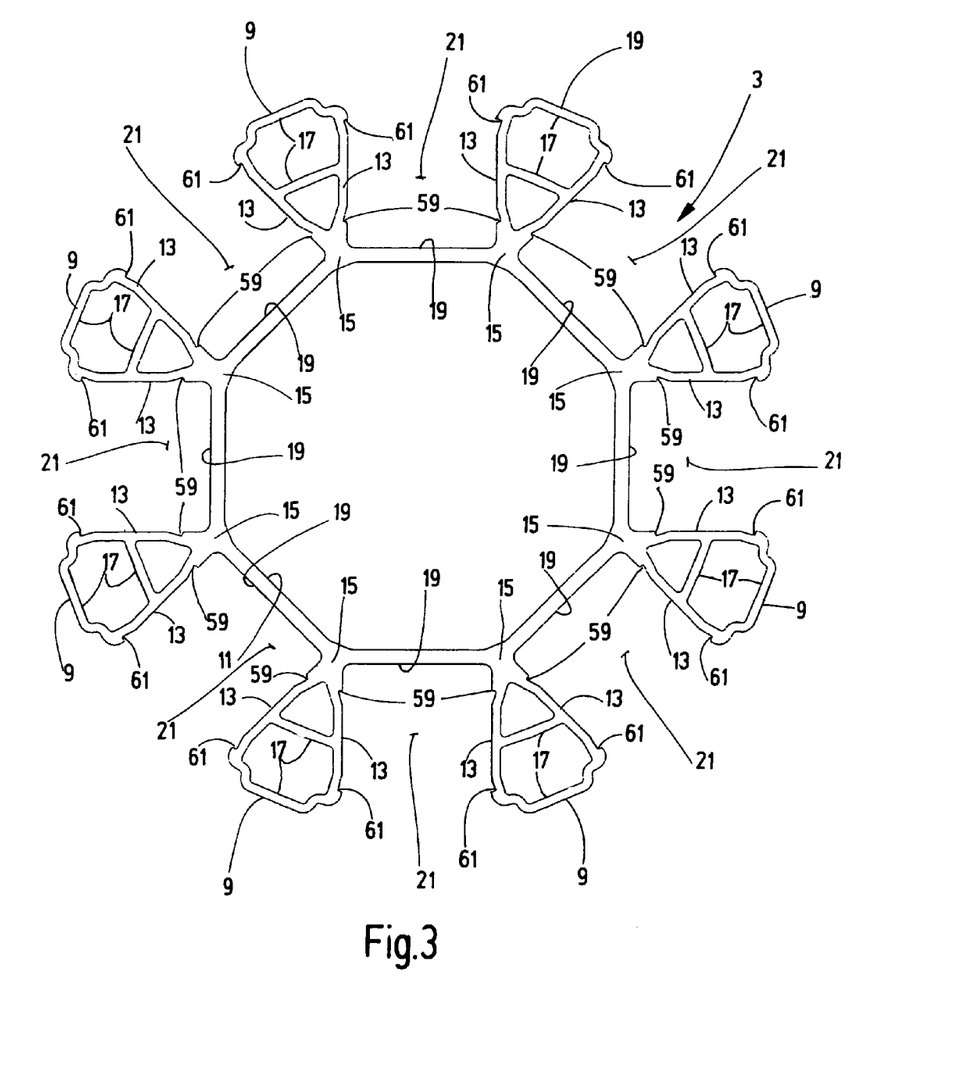
FIG. 3 is a top view of the supporting structure of the device of FIG. 1 is depicted separately.
Figure 4:
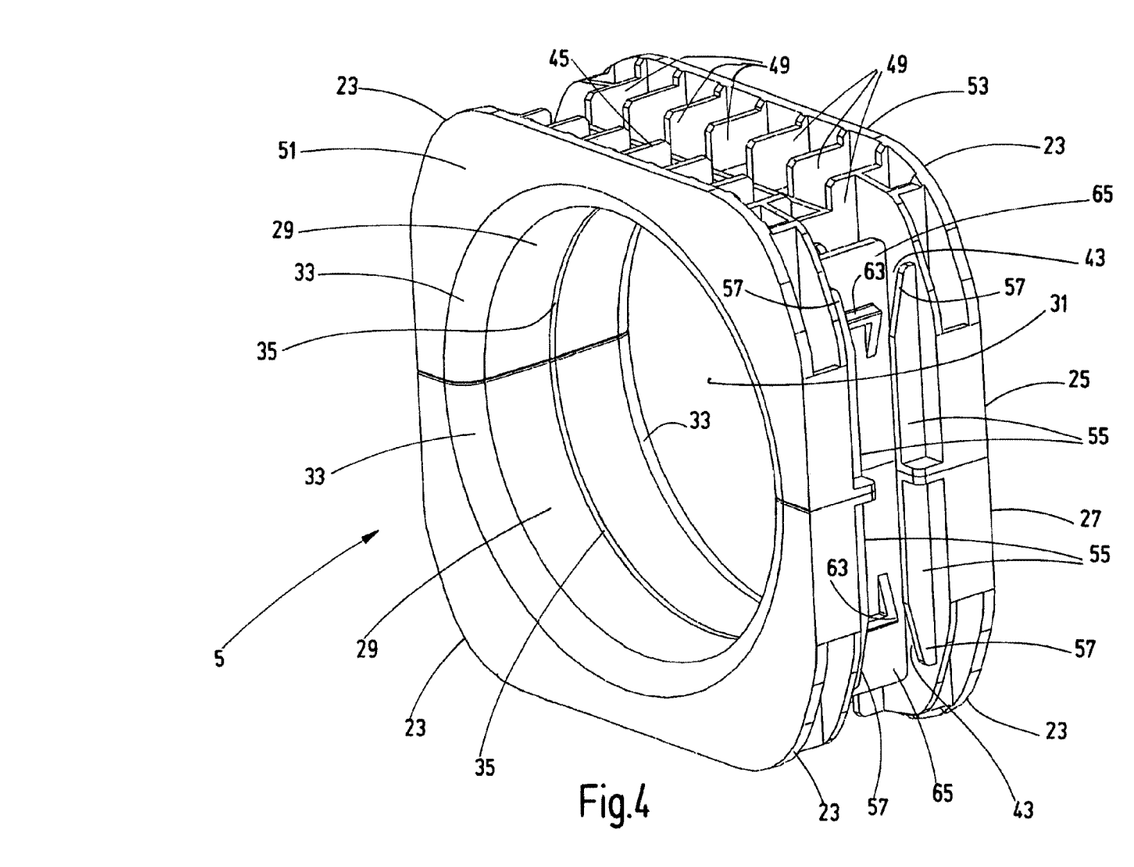
FIG. 4 is a perspective view of an individual retaining body of the device of FIG. 1 depicted on a larger scale.
Figure 7:
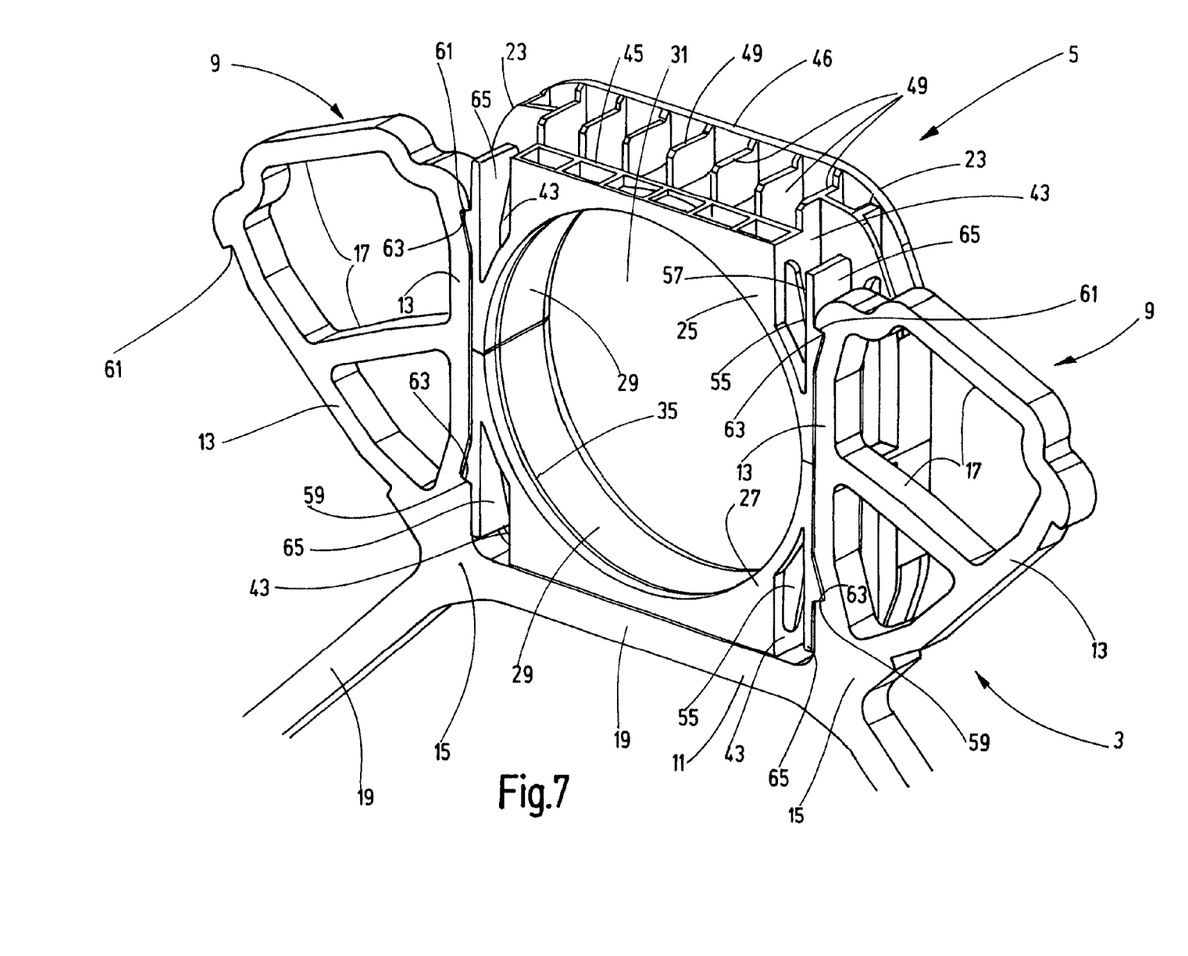
FIG. 7 is a partial perspective view, in which an individual retaining body is depicted in the installed position and in a central radial section in the device of FIG. 1.

The device according to the invention is explained with reference to the drawings based on the example of a fastening system that is provided for the guiding and fastening of cables of a cable bundle in the (not depicted) tower of a wind turbine. In accordance with the specified prior art (DE 10 2012 019 493 A1), a supporting structure 3 having a corresponding number of retaining bodies 5 is mounted on vertically mounted slide rails 7 in a not depicted tower. The supporting structure 3 is vertically displaceable, but not rotatable in the side rails 7. The supporting structure 3 has, as can be most clearly seen from FIGS. 3 and 7, the form of a star body, which has eight spokes 9 extending outwards from a noncircular inner ring 11 having the form of an octahedron. The spokes 9 are formed by arms 13, which, starting from joints 15 on the inner ring 11, extend outwards diverging from one another. The arms 13 of each spoke 9 are connected to one another by crossbelts 17. The arms 13 delimiting the spaces between consecutive spokes 9 extend parallel to one another, so that the spoke surfaces, formed on the arms 13, of two consecutive spokes 9 each form, together with the associated octagon side 19 of the inner ring 11, an installation space 21 for retaining bodies 5. With the parallel extension of the spoke surfaces on the arms 13 of the spokes 9 and their perpendicular extension relative to the adjacent octagon side 19 of the inner ring 11, the installation spaces 21 have the form of rectangles open on the outside, in this case each installation space has a form of a square.

The retaining bodies 5 have square outlines adapted to the shapes of the installation spaces 21 with rounded edge regions 23. Each retaining body comprises two partial bodies 25 and 27. These partial bodies are injection molded from a plastic material as identical parts. Each partial body 25, 27 has a centrally situated semicircular depression 29 which, in the case of partial bodies 25, 27 contacting on one another, delimit a closed circular strand passage 31. For a low-wear mounting of strand elements guided through the strand passage 31, the end edges 33 of the depressions 29 have a rounding. In order to facilitate the fastening of inserted strand elements, which are not depicted in the drawings, a rib 35 is centrally formed in the depressions 29, which rib extends in the circumferential direction and projects slightly radially inwardly.

Figure 5:
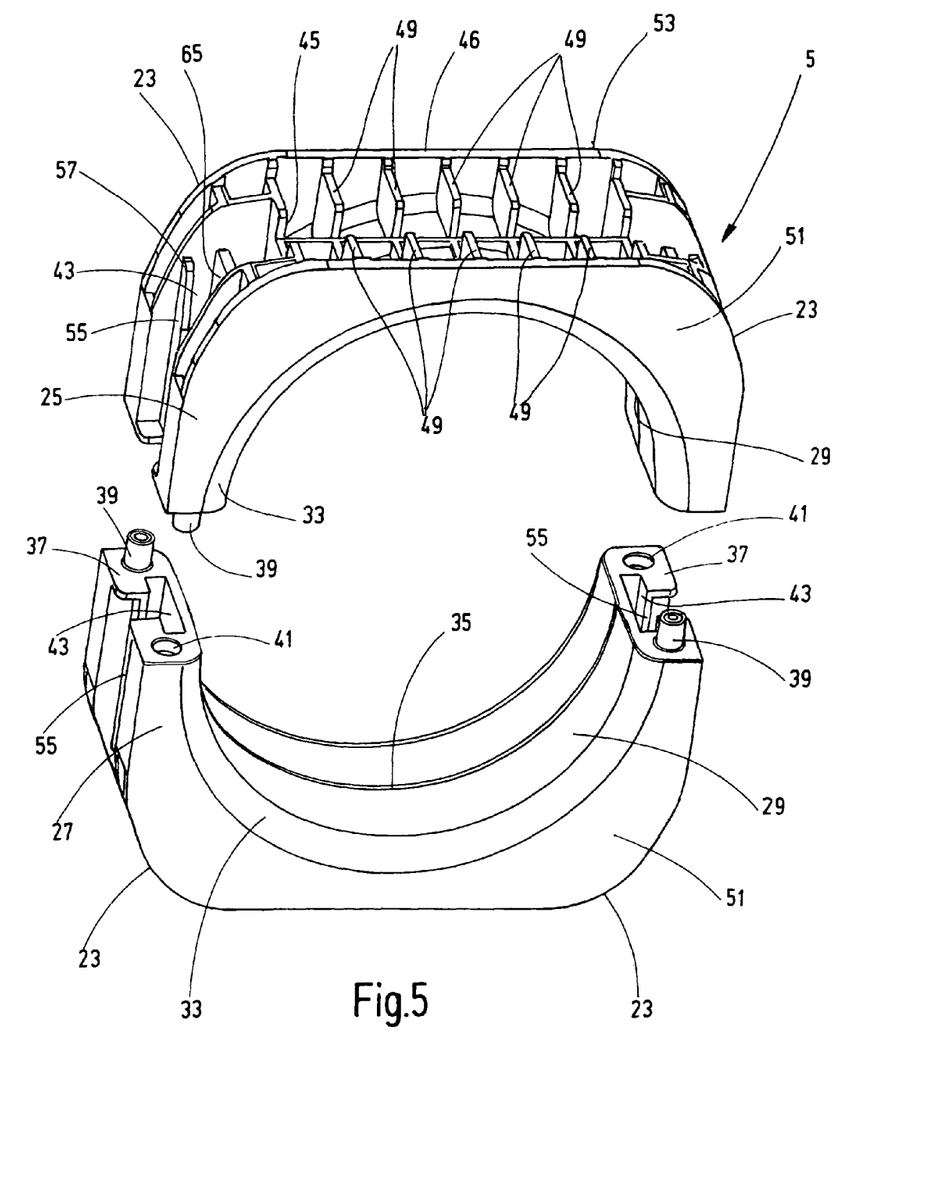
FIG. 5 is a perspective view of the retaining body of FIG. 4, wherein the partial bodies thereof are depicted detached from one another.
Figure 6:
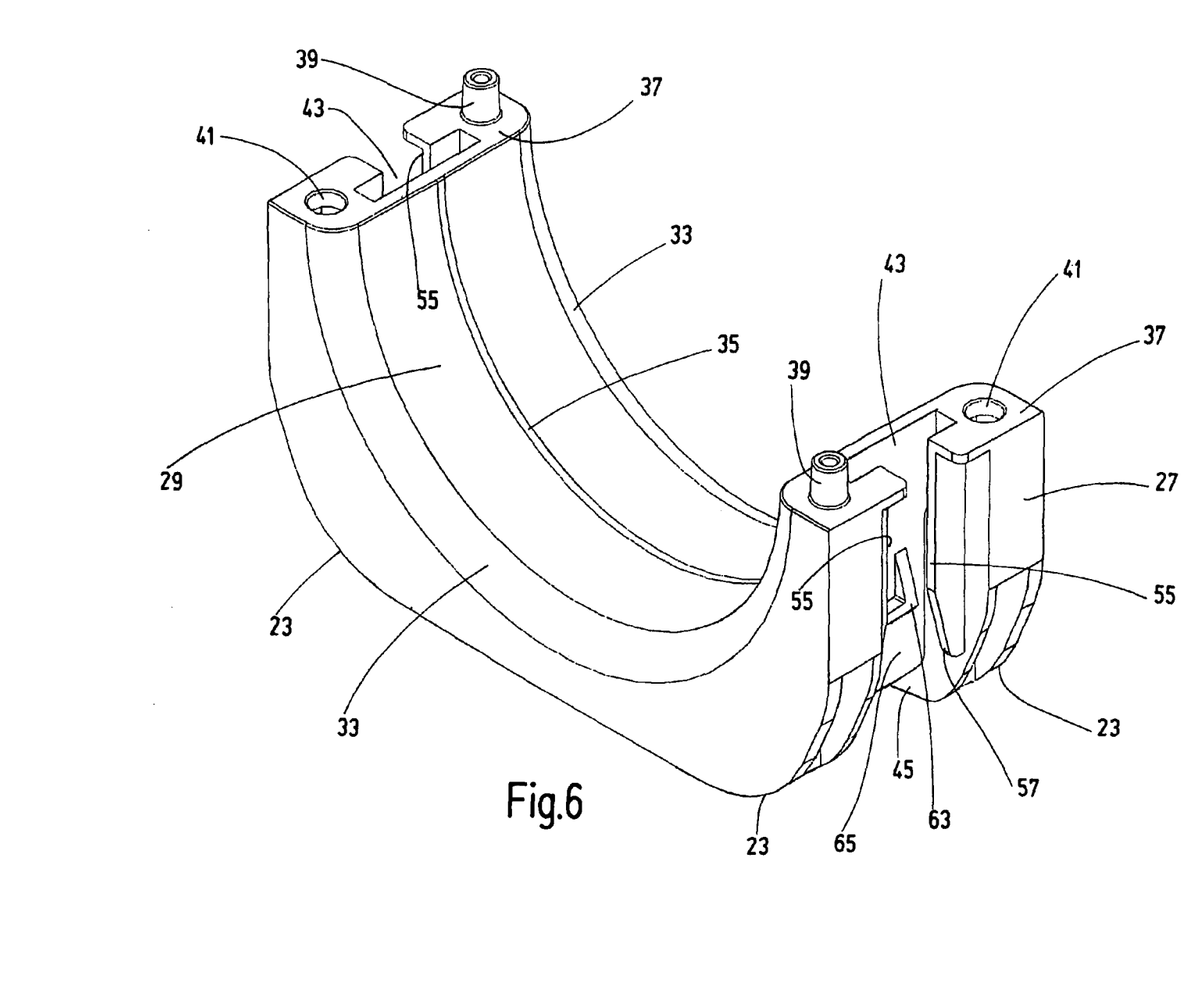
FIG. 6 is a perspective view of an individual partial body of the retaining part of FIG. 4, depicted on an even larger scale.

FIG. 5 shows the partial bodies 25, 27 in a position detached from one another. A flat contact surface 37 is located in each case on the ends of the depressions 29, see FIGS. 5 and 6. The partial bodies 25 and 27 are conjoined to form the retaining body 5 by contact of the contact surfaces 37. A projecting positioning pin 39 and a fitting bore 41 are situated on each contact surface 37.

On the sides of the retaining body 5 having the contact surfaces 37, a channel-shaped recess 43 is situated in each of the partial bodies 25, 27. Recesses 43 extend in a straight line along the entirety of the partial body sides and transition at the connecting top and bottom end side 46 into a recess 45, which is situated inside the end sides 46 and connects the side recesses 43. While the side recesses 43 have a dovetail shape, cf. FIGS. 5 and 6, the recesses 45 are delimited widthwise at the end sides 46 by only partially numbered wings 49. Wings 49 extend away from the planar front side 51 and the likewise planar back side 53 into the recess 45. These wings 49 constrict the recess 45 to a channel width, which corresponds to the material thickness of the inner ring 11 formed from a metal material. In the case of retaining bodies 5 inserted into the installation spaces 21, the straight octagon sides 19 then engage in a fitting manner in the respective facing recess 45, so that each retaining body 5 supported on the inner ring 11 is secured in a form-fitting manner on the respective octagon side 19 against axial forces.

In the recesses 43 extending along the side surfaces, slats 55 project towards one another with an end flattening 57 and limit the recess 43 to a channel width, which likewise corresponds to the material thickness of the supporting structure 3. When the respective retaining body 5 is introduced into the installation space 21, the arms 13 of the respective adjacent spoke 9 engage in a fitting manner in the recess 43, so that a form-fitting support is also formed on the arms 13. In the inserted installation position, each partial body 25 and 27 of the retaining bodies 5 is individually detachably secured on the arm 13 concerned of the adjacent spoke 9. Catches are provided as the retaining device, which catches automatically produce locking on introduction of the retaining body 5. For this purpose, sunk catch notches are formed on the arms 13 of the spoke 9 for each partial body 25, 27, namely, catch notches 59 for the partial body 27 lying on the inside and catch notches 61 for the partial body 25 lying on the outside. For cooperation therewith, detents 63 are provided on the partial bodies 25, 27. The detents project on flexible tongues 65 which, as can be best seen from FIG. 6, project into the recess 43 starting from the contact surfaces 37. With the elastic flexibility of the tongues 65, on introduction of the retaining bodies 5, the detents 69 automatically enter into the notches 59, 61 to form the lock. The outer catch notches 61 form a kind of hook preventing the pulling out of the top partial body 25 when the lock is formed. In order to disengage this lock for a desired disassembly operation, the ends of the tongues 65 of the top partial body 25 are accessible from above, as can be seen from FIG. 7, which shows the installed state. The lock can then be manually disengaged without the use of tools. Once the top partial body 25 has been removed, the bottom partial body 27 can be taken out countering the retention force formed only by the force fit of the tongues 65. The tongues 65 with the detents 63 are moved inwards along the angular face connecting to the notch 59.

For a particularly structurally-strong and short circuit-proof formation of the device used as a fastening system in a wind turbine, in which the supporting structure 3 is preferably formed from a metal material, a tensioning strap 69 guided over the outer circumference is provided to ensure reliable cohesion of the system. The tensioning strap can be tensioned by a quick-tensioning closure 71 of a design which is customary for tensioning straps. For the guiding of the overall structure formed from the supporting structure 3 and retaining bodies 5 on the slide rails 7 of the tower concerned, a pair of castors 73 are provided on each of diametrically opposite sides of the tensioning strap 69 on that tensioning strap. The castors are mounted on a support 75, which is fastened to a retaining bracket 77 welded to the tensioning strap 69.

Instead of the circular strand feedthroughs 31 formed by semicircular depressions 29, strand feedthroughs of another form can be provided. Also, the strand feedthroughs 31 can be formed with different sizes in individual retaining bodies 5 that are provided as a module of the system. Instead of the eight retaining bodies 5 depicted in the present example, the retaining bodies can be provided in different numbers on the supporting structure 3, for example also in such a way that any number of installation spaces 21 are left empty.

While one embodiment has been chosen to illustrate the invention, it will be understood by those skilled in the art that various changes and modifications can be made therein without departing from the scope of the invention as defined in the claims.

The invention claimed is:

1. A device for fastening or guiding strand-shaped elements, the device comprising:
    a supporting structure being a body with pairs of adjacent spokes extending radially from said body, said spokes of each of said pairs having parallel surfaces defining installation spaces with said parallel surfaces, said installation spaces opening radially outwardly of said body at open ends of said installation spaces;
    retaining bodies coupled to said star-shaped body forming a modular fastening system, each of said retaining bodies having a strand passage capable of receiving at least one strand element and including first and second partial bodies, each of said first and second partial bodies forming a part of the respective strand passage, said partial bodies being insertable from said open ends of said installation spaces into installation positions; and
    retaining devices located between each of said first and second partial bodies and said spokes adjacent thereto, said retaining devices separately, detachably and individually fastening each of said partial bodies in said installation positions against radial movement relative to said spokes and in contact with one another of the respective retaining bodies to complete the respective retaining bodies.

2. A device according to claim 1 wherein said first and second partial bodies of each of said retaining bodies comprises two identical parts.

3. A device according to claim 1 wherein said retaining devices of each of said partial bodies comprise catches on spoke sides of said spokes facing the respective installation spaces and on body sides of said partial bodies facing the respective spoke sides.

4. A device according to claim 1 wherein each of said partial bodies has a recess on body sides thereof facing the respective spokes, said recesses forming channels receiving at least portions of the respective spokes when said partial bodies are introduced into the respective installation spaces.

5. A device according to claim 3 wherein the respective catches lock upon introduction of said partial bodies in the respective installation spaces.

6. A device according to claim 3 wherein said catches on said spoke sides comprise sunk catch notches; and
    said catches on said body sides comprise detents cooperatable with the respective sunk catch notches, said detents being a channel-shaped recess on flexible tongues.

7. A device according to claim 6 wherein said sunk catch notches lie outside of said partial bodies on said supporting structure and have hook-shaped projecting lock surfaces engagable with the respective detents preventing said partial bodies from being pushed out of the respective installation spaces by a form fit, said flexible tongues of said detents being accessible outside of said supporting structure for releasing engagement of said catches.

8. A device according to claim 6 wherein said supporting structure comprises an inner boundary of said installation spaces, said inner boundary having a non-circular inner ring forming an octahedron; and
    said partial bodies of said retaining bodies have straight end sides extending between said body sides thereof, said straight end sides of said partial bodies having channel-shaped recesses engaging said inner ring.

9. A device according to claim 1 wherein said partial bodies have depressions forming halves of said strand passages and flat contact surfaces extending perpendicular to body sides of said partial bodies engaging said spokes of said body and being next to said depressions, the respective flat surfaces of said first and second partial bodies of each of said retaining bodies contacting one another; and projecting positioning pins and fitting bores engaging the respective ones of said positioning pins are on each of said contact surfaces.

10. A device according to claim 1 wherein a tensioning strap extends over outside surfaces of said retaining bodies located in said installation spaces.

11. A device according to claim 10 wherein guide rollers are mounted on diametrically opposite sides of said tensioning strap, said guide rollers being engaged with slide rails vertically arrangeable in a tower of a wind turbine.

12. A device according to claim 1 wherein said strand passages comprises rounded end edges.

\* \* \* \* \*